United States Patent Office 3,076,769
Patented Feb. 5, 1963

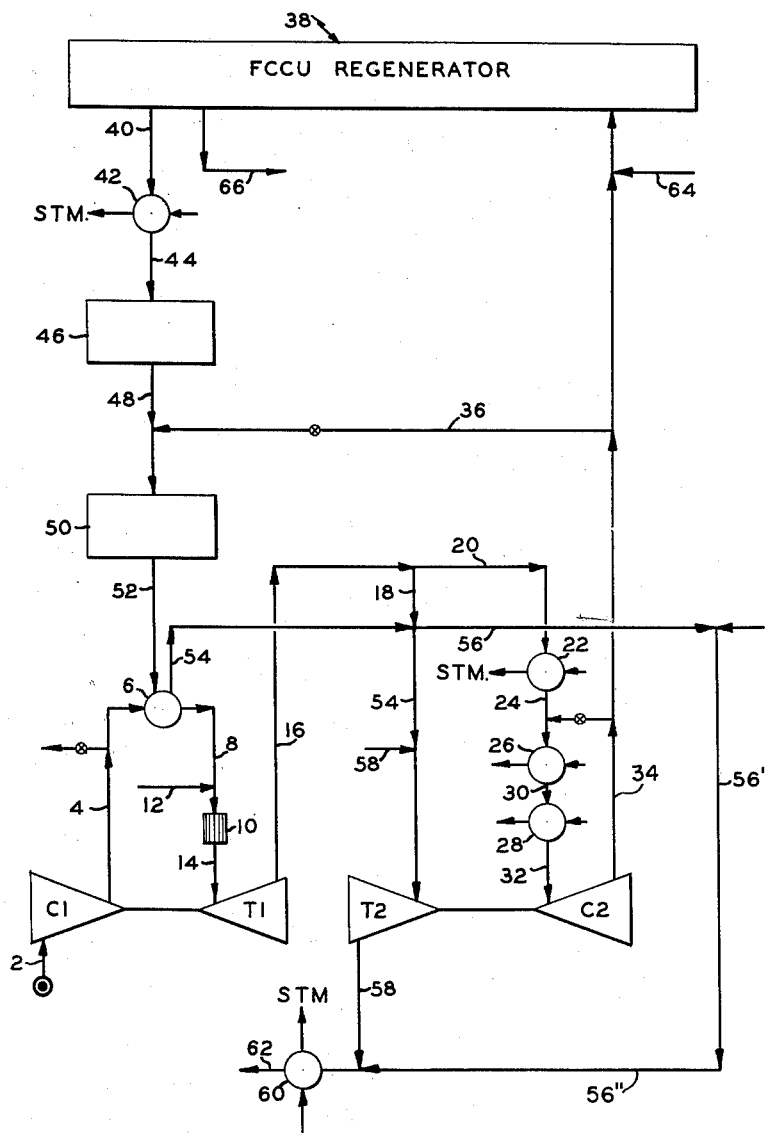

3,076,769
METHOD FOR SUPPLYING GASEOUS MATERIAL IN A FLUIDIZED PROCESS
Robert W. Pfeiffer, Bronxville, N.Y., assignor to The M. W. Kellogg Company, Jersey City, N.J., a corporation of Delaware
Filed Oct. 22, 1959, Ser. No. 847,927
8 Claims. (Cl. 252—417)

This invention is directed to the method and means for supplying large volumes of gaseous material for use in treating finely divided solid particle material. In one embodiment the invention is directed to the method and means for supplying a sufficient quantity of gaseous material for use in a fluidized catalytic cracking process. In a specific embodiment the invention is directed to an improved arrangement of process steps employing gas turbine-compressor prime movers for supplying regeneration gas to a fluidized catalytic regeneration process.

Turbine-compressor machines have been proposed for use in a variety of industrial processes, but have had little success commercially for a variety of reasons including, (1) the non-availability of a turbine-compressor of sufficient capacity to supply the volume of gaseous material required, (2) the necessity to employ a relatively large number of turbine-compressors in parallel flow arrangement, thereby necessitating elaborate and expensive piping systems, and (3) relatively high initial investment and operating costs. These problems become amplified in commercial processes requiring large volumes of gaseous material and are of particular importance when treating finely divided solid particle material under conditions known as fluidized conditions.

In fluidized catalytic cracking processes being employed today relatively large vessels having a high catalyst inventory of the order of about 1000 tons of catalyst are employed. The cost associated with air compressor requirements and particularly the facilities required to develop the power to drive the air compressors of such large units constitutes one of the major cost items of a catalytic cracking system. Furthermore, the fact that fluidized finely divided solid catalytic material is employed in the process emphasizes the problems in conjunction with such a system. Consequently the regeneration stage will quite often impose rather extreme limitations on the equipment and capacity of such a commercial system. As a result thereof every effort is made by the designer and the operator to reduce investment and operating costs associated with the performance of such large systems.

It is an object of this invention to provide an improved method and means for supplying gaseous material for use in contacting finely divided solid contact material.

It is another object of this invention to provide relatively large quantities of regeneration gaseous material in relatively low pressure processes requiring the same.

It is a specific object of this invention to provide an improved and thermodynamically efficient process for supplying regeneration gaseous material in a fluidized catalytic cracking system.

Other objects and advantages of this invention will become apparent from the following description.

It has long been recognized that the regeneration of catalyst in a catalytic cracking process releases relatively large amounts of energy which, if properly recovered and/or harnessed, may be efficiently utilized in the performance of the process. Applicant's approach to this energy recovery problem has been directed to the development of a system employing turbine-compressors which will be both economically attractive and thermally efficient.

In a relatively dense fluidized catalytic regeneration system operating at elevated temperatures in the range of from about 1050° F. to about 1400° F., from which relatively hot carbon monoxide containing flue gases are withdrawn at an elevated temperature above about 1000° F. and in the range of from about 1070° F. to about 1200° F. and an elevated pressure, the flue gases which have a relatively high heat content, and if properly treated or handled, may be employed to reduce utilities costs of the process and also may be employed for the development of useful power to drive necessary pumps and compressors in the process. However, in relatively all systems employing finely divided solid contact material the flue gases will contain a substantial quantity of entrained solid fines, which must be removed from the flue gases prior to their conversion into useful energy. In a system employing a turbine-compressor arrangement in conjunction with a fluidized catalytic cracking system the regenerator is employed in such a system as a combustion chamber from which the hot effluent gases are recovered at an elevated temperature and pressure and the thus recovered effluent gases, after suitable treatment, are expanded in a turbine to develop power which may be utilized to drive a load. In the arrangement of process steps herein discussed, at least two compressor-turbine arrangements are employed such that the turbines develop power to drive compressors directly connected to the turbines. Accordingly, applicant's invention is directed in one embodiment to the efficient recovery of heat energy of the flue gases in conjunction with an arrangement of process steps employing turbine-compressors for supplying the required quantity of regeneration gas to the system.

When a fluidized catalyst regeneration system is employed, the flue gases recovered at an elevated temperature are of reduced pressure with respect to the inlet pressure of the gases to the system because of a pressure drop encountered in the fluidized catalyst bed in the regenerator, as well as in the flue gas recovery system including cyclone separators and suitable piping. Although this differential pressure or pressure drop of the system is of relatively low order, nevertheless, it imposes problems in the system with respect to the expansion of hot regenerator flue gases under conditions suitable to provide the necessary power requirements of the compressor employed to supply the regeneration gas to the system. Accordingly, the inlet pressure to the turbine will be less than the outlet pressure of the compressor. Since this is true, less power can be developed by expansion of the flue gases in the turbine to drive the compressor. Accordingly, applicant has adapted a two-shaft gas turbine to suitable compressors in an improved arrangement of process steps which will efficiently utilize the energy of the flue gases recovered from a fluidized catalytic regeneration system in a manner such that at least sufficient power will be provided to drive the compressors and supply gas to the system at the desired elevated pressure.

Accordingly, applicant's system utilizes a two-shaft gas turbine; the exhaust from the high pressure turbine being withdrawn and passed to a booster compressor from whence it is withdrawn and employed as regeneration combustion air. The regenerator flue gas is recovered and after suitable treatment is expanded in a low pressure or load turbine. The load turbine is employed to drive the booster compressor which raises the pressure of the combustion air to the level necessary for the regeneration step.

Accordingly, the improved arrangement of process steps herein discussed provides a thermodynamically efficient system which may be used for supplying gaseous material at a desired pressure and temperature in a fluidized contact material system. More specifically, the arrangement of process steps herein discussed were developed to supply sufficient regeneration gas to a fluidized catalyst regeneration system having a coke burning capacity rated at about 50,000 pounds per hour. As an integral part of the improved arrangement of process steps herein discussed a commercially available two-shaft combustion machine is employed. This machine is constructed such that located on one shaft are the axial-flow compressor and the high pressure stages of the turbine. This portion of the machine supplies only the power for the axial compressor and provides no useful output power. On the second shaft is positioned the low pressure load turbine which provides the power to drive an external load. In the systems herein described the load turbine is employed to drive a second compressor which may be a centrifugal or an axial flow compressor and used as a booster compressor.

As herein indicated, one of the important considerations of any system employing flue gases from a fluidized catalyst system in expander turbines relates to the removal of entrained catalyst fines from the flue gases to a suitable low value such that the flue gases can be expanded in the turbine without damaging the turbine blades. To accomplish the above, a fines removal system consisting of one or more stages of small cyclones has been provided for removing entrained catalyst fines not sufficiently removed by the cyclone separators in the regenerator of the system. In the fines removal system herein employed, each stage of cyclones consists of about 1000 parallel tubes, with each tube handling about 100 c.f.m. of gas. Positive distribution is obtained by limiting the number of tubes per vessel to approximately 300, by providing positive circumferential inlet flow distribution around each vessel, and by introducing the gas into each vessel above the level of the cyclone inlets, thus permitting the gas to flow over the nest of tubes and down to the tube inlets rather than forcing it to flow through the nest of tubes. As an aid to proper distribution, a solids blow-down of 1 percent of gas flow per stage may also be provided. This latter arrangement also permits a simple method of removing the fines from the collection system since without such a blow down system, a lock-hopper system must be employed to dispose of the separated fines. The concentration of fines in the flue gas downstream from three stages of the fines removal system described above will be less than about 30 parts per million (p.p.m.) or about .01 to about .02 grain per cubic foot, with about 85 percent of the particles being less than three microns in size and about 96 percent of the particles being less than about 5 microns size material. The fines removal system employed in the sequence of steps herein discussed is sufficiently efficient that the blade life of the two-stage load turbine under the catalyst loading from the fines removal system will be of the order of about 100,000 hours or substantially the same as that which would be expected without substantially any dust in the gaseous material. It is contemplated, however, that instead of blade erosion in the system herein proposed, there may be a build up of finely divided particles on the turbine blades which might produce unbalance in the turbine rotor. In order to overcome such a condition there is provided a transfer conduit from the solids blow down of the first or second stage of small cyclones to the turbine inlet, thereby permitting occasional and controlled scouring of the turbine blades with more coarse finely divided particle material to remove any accumulation of fines in the turbine blades.

In the improved system discussed herein, three waste heat boilers are provided for the generation of steam by the cooling of various gas streams in the system. That is, one waste heat boiler removes heat from the hot exhaust gas from the high pressure section of the gas turbine prior to the compression of this gas. Another waste heat boiler remove heat from the regenerator flue gas prior to passing the flue gas to the fines removal system. Still another waste heat boiler recovers the high level heat in the load turbine exhaust gases. In addition to the above waste heat boilers, two boiler feed preheaters remove heat from the gaseous material passed to the booster compressor. In this embodiment the boiler feed is first heated from about 100° F. to about 240° F. prior to deaeration. After deaeration the boiler feed is then heated to a temperature of about 415° F. and sufficient boiler feed water for all three of the waste heat boilers herein discussed is preheated.

One method for increasing the recovery of useful energy from the flue gases withdrawn from the regeneration step involves burning of the carbon monoxide contained in the flue gases. The burning of the carbon monoxide is accomplished preferably after the removal of catalyst fines in the system herein proposed by mixing the flue gases with air and passing the mixture through a suitable oxidation catalyst which will initiate combustion of the carbon monoxide at a relatively low temperature of about 750° F. and raise the temperature of the flue gases by combustion of the carbon monoxide therein to an elevated temperature in the range of from about 1400° F. to about 1600° F.

As a specific example of one method of operation, atmospheric air is compressed to about 74 p.s.i.a. in the axial compressor of the two-shaft gas turbine. The thus compressed air is preheated by indirect heat exchange with hot regeneration effluent gases and thereafter fired with sufficient fuel gas to raise the temperature of the compressed air to a temperature of about 1350° F. The hot compressed gases containing about 18 percent oxygen enters a first turbine hereinafter referred to as a high pressure turbine wherein the compressed air at an elevated temperature and pressure is expanded to about 26 p.s.i.a. and a temperature of about 1000° F., thereby producing sufficient power to drive the axial compressor directly connected therewith. The exhaust gases are recovered from the high pressure turbine and a major portion of the recovered gas is then passed to a booster compressor after being cooled to a temperature of about 250° F. A minor portion of the effluent gases from the high pressure turbine are passed to the second turbine in admixture with regeneration effluent gases more fully described hereinafter. Sufficient regeneration air effluent gases recovered from the high pressure turbine to supply the necessary oxygen for combustion of coke in the regenerator as well as combustion of CO in the carbon monoxide burner is routed to the booster compressor as herein described. A minor portion of the compressed air recovered from the high pressure turbine may be passed to the second or low pressure turbine inlet through an open substantially unrestricted bypass line between the two turbine stages and permits operation of the two-shaft gas turbine as a prime mover in the manner for which it was designed. That is, the high pressure turbine exhaust and the low pressure turbine inlet are substantially the same conditions of pressure with the temperature to the inlet to the low pressure turbine being controlled as required by the external load by suitable condensate spray means. As herein indicated, the compressed air recovered from the high pressure turbine is cooled in a waste heat boiler and two boiler feed water preheaters to a temperature of about 250° F. with the thus cooled regeneration gas being at a pressure of about 22.4 p.s.i.a. In the booster compression stage of the system, the combustion air for use in the regenerator, as well as the flue gas CO burner, is compressed to an elevated pressure of about 42 p.s.i.a. with the major portion of the thus compressed air being passed directly to the regeneration step of the process and a minor portion of the thus compressed combustion air being passed to the CO burner step more fully described hereinafter. In the regenerator, combustion of carbonaceous deposits or coke on the catalyst is effected, thereby raising the temperature of the regeneration effluent gases to a temperature of about 1070° F. and a pressure of about 31.5 p.s.i.a. The regenerator flue gas is recovered and cooled to a temperature of about 775° F. in a waste heat boiler, thereby generating process steam prior to passing the flue gases to the catalyst fines removal system. In the catalyst fines removal system catalyst fines entrained in the flue gas are substantially removed therefrom in three stages of small cyclones which lower the fines concentration in the flue gas to a value in the range of from about 15 to about 30 p.p.m. The flue gases are then recovered from the fines removal system, are mixed with a portion of the combustion air, and the combined stream at a temperature of about 750° F. is passed to a carbon monoxide burner containing an oxidation catalyst. In the system proposed herein approximately 90 percent of the carbon monoxide is burned to carbon dioxide and the temperature of the flue gas stream is raised from about 750° F. to about 1465° F. This hot effluent gas is then used to preheat the air indirectly from the axial compressor in order to conserve and minimize the quantity of fuel required to raise the temperature of the compressed air by burning to a suitable temperature for introduction into the gas turbine connected to the axial compressor. In the indirect heat exchange step the regenerator flue gases give up heat to the compressed regeneration air with the temperature of the flue gases being reduced to a temperature of about 1050° F. Thereafter the flue gases pass to the low pressure turbine with or without a minor portion of regeneration air from the high pressure turbine, which is passed through the open bypass line. In the event that the temperature of the combined regeneration flue gases and compressed air is above that temperature desired for introduction into the low pressure turbine, suitable condensate spray may be added to the stream to reduce the temperature thereof to about 1000° F. Thereafter the regeneration flue gases are expanded in the low pressure gas turbine which develops sufficient power to drive the booster compressor hereinbefore discussed. In the event that there is an excess of flue gas or air over that required for the low pressure turbine a bypass is provided which permits combining the excess flue gas or air with the low pressure turbine exhaust. This combined stream is then cooled in a waste heat boiler and thereafter vented to the atmosphere.

It is contemplated employing one or more duplicate systems similar to the system herein described and in substantially parallel flow arrangement to provide any desired quantity of regeneration gas.

Having thus described generally the improved arrangement of process steps of this invention and given a specific example thereof, reference is now had by way of example to the drawing which presents diagrammatically the preferred arrangement of process steps of this invention as applied to the regeneration step of a hydrocarbon catalytic conversion process.

Referring now to the drawing, atmospheric air is admitted by conduit 2 to an axial compressor $C_1$ of a two-shaft gas turbine compressor system having a high pressure turbine $T_1$ and low pressure turbine $T_2$. Directly connected to the low pressure turbine $T_2$ is a second compressor $C_2$. In axial compressor $C_1$ atmospheric air admitted by conduit 2 is compressed to an elevated pressure of about 74 p.s.i.a., thereby elevating the temperature of the compressed air to about 485° F. The thus compressed air stream is then passed by conduit 4 to heat exchange 6 wherein the temperature of the compressed air is indirectly raised to about 945° F. by passing in indirect heat exchange with regeneration flue gas as more fully discussed hereinafter. The compressed and indirectly heated air stream is then passed by conduit 8 to combustion zone 10 wherein it is further heated to an elevated temperature of about 1350° F. by burning with a suitable fuel introduced by conduit 12. The compressed air stream at a pressure of about 72 p.s.i.a. and a temperature of about 1350° F. is then passed from combustor 10 by conduit 14 directly to turbine $T_1$ wherein the compressed air is expanded to a pressure of about 26 p.s.i.a. and a temperature of about 1000° F., thereby developing sufficient power to drive axial compressor $C_1$. 100 percent flow in axial compressor $C_1$ amounts to about 468,320 pounds per hour of air. The expanded air stream is withdrawn from turbine $T_1$ by conduit 16 and separated into two streams comprising a major stream amounting to about 85 percent of the total air stream and a minor stream amounting to about 15 percent of the total air stream. The minor stream of air is allowed to pass through an unrestricted bypass line 18 to turbine $T_2$ in admixture with regeneration flue gas as more fully described hereinafter or to vent. The major air stream amounting to about 85 percent of the total air stream and at a pressure of about 26 p.s.i.a. and a temperature of about 1000° F. is passed by conduit 20 to a waste heat boiler 22. In waste heat boiler 22 heat from the hot exhaust gases recovered from the high pressure turbine $T_1$ is removed by indirect heat exchange with water for the generation of steam. In waste heat boiler 22 the expanded air stream is reduced to a temperature of about 685° F. The thus cooled air stream is then passed by conduit 24 to two boiler feed preheaters 26 and 28 shown connected in series by conduit 30 wherein the temperature of the air stream is further reduced to a temperature of about 250° F. prior to compression of the air stream in compressor $C_2$. The thus cooled air stream is then passed by conduit 32 to compressor $C_2$ driven by turbine $T_2$. In compressor $C_2$ the air stream is compressed to an elevated pressure of about 41.5 p.s.i.a., thereby raising the temperature of the air stream to about 430° F. The thus compressed air stream is withdrawn from compressor $C_2$ and passed by conduit 34 to the regenerator of the fluid catalytic cracking process. Provision is made for utilizing a portion of the compressed air stream from compressor $C_2$ to burn regenerator flue gases in a carbon monoxide burner more fully discussed hereinafter. Accordingly, a minor portion of the compressed air from compressor $C_2$ may be passed by conduit 36 for admixture with flue gases passed to the CO burner. Regeneration flue gases are recovered from the fluid catalytic cracker regeneration section 38 by conduit 40 at an elevated temperature of about 1070° F. and a pressure of about 31.7 p.s.i.a., and passed by conduit 40 to a second waste heat boiler 42 to remove heat from the regenerator flue gases and lower the temperature thereof to about 775° F. The thus cooled regeneration flue gases are then passed by conduit 44 to catalyst fines removal system 46. In the catalyst fines removal system 46 entrained finely divided solids in the flue gas are removed such that less than 30 p.p.m. of entrained fines remain in the flue gas. The thus treated flue gas is withdrawn from fines removal section 46 and passed by conduit 48 to a CO burner 50. As hereinbefore mentioned, a portion of the air stream from compressor $C_2$ may be passed by conduit 36 for admixture with the flue gases in conduit 48 to promote combustion of the flue gases in the CO burner. In CO burner 50 flue gases are burned in the presence of a catalyst which promotes combustion at a relatively low temperature of about 750° F., whereby the temperature of the flue gases is raised to an elevated temperature of about 1465° F. Thereafter, the flue gases are removed from CO burner 50 at a pressure of about 27.2 p.s.i.a. and a temperature of about 1465° F. and passed by conduit 52 to heat exchanger 6 in indirect heat exchange with compressed air from axial compressor $C_1$, thereby giving up heat to the compressed air and cooling the regeneration flue gases to a temperature of about 1050° F. The regeneration flue gases are then removed from heat exchanger 6 at a pressure of about 26 p.s.i.a. and a temperature of about 1050° F. and passed by conduit 54 to low pressure turbine $T_2$. In the event that there is an excess of regeneration flue gas over that required for expansion in turbine $T_2$ withdrawal conduits 56, 56' and 56" are provided for withdrawing a portion of the regeneration flue gases and bypassing turbine T₂. One of the important aspects of the arrangement of process steps of this invention resides in maintaining the discharge pressure of turbine T₁ substantially equal to the inlet pressure of turbine T₂ in order that the apparatus may function as a prime mover in the manner for which it was designed. Accordingly, open bypass line 18 will permit unrestricted flow of gaseous material therethrough such that the regeneration flue gases in conduit 54 are at substantially the same pressure as the exhaust gases from turbine T₁. In addition to the above, provisions are made for introducing a suitable condensate material by conduit 58 or coolant material to conduit 54 in order to reduce the temperature of this stream to a temperature of about 1000° F., prior to expanding the regeneration flue gases at a pressure of about 26 p.s.i.a. in turbine T₂. The regeneration effluent gases are recovered from turbine T₂ at a temperature of about 850° F. and a pressure of about 15.2 p.s.i.a. The thus recovered gases are passed by conduit 58 and combined with any excess regeneration effluent gases in conduit 56" and thereafter passed to waste heat boiler 60 for the generation of additional steam. Cooled regeneration effluent gases are removed from waste heat boiler 60 by conduit 62 and vented to the atmosphere. In the system herein described, waste heat boiler 42 produces about 44,080 pounds per hour of steam, waste heat boiler 22 produces about 41,090 pounds per hour of steam and waste heat boiler 60 produces about 53,150 pounds per hour of steam.

It is contemplated employing a duplicate unit or system of the system herein described, and in substantially parallel flow arrangement therewith. When employing such a duplicate system the compressed air being passed to the regenerator may be introduced to the system herein discussed by conduit 64 and regeneration effluent gases may be removed by conduit 66 for passage to the duplicate system.

It is also to be understood that the improved process and sequence of steps described herein may be employed in other relatively low pressure processes employed whether fixed bed or suspension type of processes and is not necessarily limited to dense fluid bed processes.

Having thus generally described the improved method of this invention and given specific examples thereof, it is to be understood that no undue restrictions are to be imposed by reason thereof and any modifications may be made thereto within the scope of this invention without departing from the spirit thereof.

Having thus described my invention, I claim:

1. A method for utilizing the available heat energy of a carbon monoxide containing flue gas stream recovered from a regeneration zone at an elevated pressure and a temperature above about 1000° F. which comprises removing flue gas containing carbon monoxide and finely divided particle material from a fluidized particle material regeneration zone, partially cooling said flue gases by generating steam in a steam generating zone, removing finely divided particle material from said partially cooled flue gases, burning carbon monoxide contained in said flue gases after removal of particle material therefrom in a carbon monoxide combustion zone to reheat to an elevated temperature the flue gases recovered from the regeneration zone, partially cooling said reheated flue gases in an indirect heat exchange zone with compressed air from a first compression zone, passing partially cooled flue gases from said indirect heat exchange zone to a turbine zone, passing compressed air obtained from said first compression zone to a second compression zone, said second compression zone employed to supply regeneration air at a desired pressure to said regeneration zone and utilizing the energy of said flue gas in said turbine zone to develop power to drive said second compression zone.

2. A method for supplying compressed oxygen-containing regeneration gas to a regeneration zone containing finely divided solid particle catalytic material contaminated with carbonaceous deposits which comprises passing oxygen-containing regeneration gas to a compression zone to compress said regeneration gas suitable for passage to said regeneration zone, passing a major portion of said compressed regeneration gas from said compression zone to said regeneration zone wherein carbonaceous deposits are burned with the oxygen-containing compressed regeneration gas to produce a flue gas at an elevated temperature and pressure containing carbon monoxide, recoving flue gas at an elevated temperature and pressure from said regeneration zone, partially cooling said recovered flue gas in a steam generating zone, passing partially cooled compressed flue gas with a portion of said compressed regeneration gas from said compression zone to a carbon monoxide combustion zone wherein the flue gas is heated to an elevated temperature by combustion of carbon monoxide contained therein, recovering heat from the flue gas recovered from said combustion zone in an indirect heat exchange zone sufficient to partially cool said compressed flue gas and thereafter passing partially cooled flue gas at a pressure above atmospheric pressure to a turbine zone wherein the flue gas is expanded under conditions to generate power to drive said compression zone.

3. An improved method for developing power to drive compressors and efficiently utilizing the heat content of combustion gases which comprises recovering combustion gases containing carbon monoxide at an elevated temperature from a first combustion zone, partially cooling said recovered combustion gases in a first cooling zone, heating said partially cooled combustion gases by burning the carbon monoxide contained therein in a second combustion zone, passing combustion gases at an elevated temperature from said second combustion zone in indirect heat exchange with a first compressed gas stream containing combustible material therein to heat said first gas stream and partially cool said combustion gases, partially burning said first gas stream to further heat said first gas stream to an elevated temperature, expanding the first gas stream at an elevated temperature in a first turbine under conditions to drive a compressor and supply said first compressed gas stream, passing expanded gas containing combustible material from said first turbine at a reduced temperature to a second compressor, passing a portion of said combustion gases from said indirect heat exchange step to a second turbine connected to said second compressor, expanding combustion gases in said second turbine under conditions to develop power to drive said second compressor, recovering compressed gas containing combustible material from said second compressor, passing compressed gas from said second compressor to said first combustion zone, passing compressed gas from said second compressor to said second combustion zone and providing unrestricted flow of gaseous material between the outlet of said first turbine and the inlet of said second turbine.

4. A method for supplying regeneration gas to a regeneration zone and utilizing the heat content of the flue gases recovered from the regeneration zone which comprises maintaining a first compressor driven by a first turbine, a second compressor driven by a second turbine, maintaining the outlet pressure of said first turbine substantially equal to the inlet pressure of said second turbine and providing for unrestricted flow of gaseous material therebetween, passing compressed regeneration gas from said second compressor to said regeneration zone, recovering compressed flue gas from said regeneration zone, heating compresed flue gas recovered from said regeneration zone by burning in a first combustion zone with a portion of the regeneration gas obtained from said second compressor, recovering heated flue gas from said first combustion zone, passing compressed regeneration gas from said first compressor in indirect heat exchange with said heated flue gas recovered from said first combustion zone, further heating said indirectly heated regeneration gas by burning a combustible fuel therewith in a second combustion zone, passing regeneration gas from said second combustion zone to said first turbine to develop power therein to drive said first compressor, passing regeneration gas after cooling from said first turbine to said second compressor and passing a portion of the flue gas from said indirect heat exchange step to said second turbine to generate power therein to drive said second compressor.

5. In a process wherein oxygen-containing gas such as air is supplied to a regeneration zone containing a solid material requiring regeneration and flue gases are removed from said regeneration zone at an elevated temperature above about 1000° F., the improved method of operation in efficiently utilizing the heat content of said flue gases in conjunction with a two shaft gas turbine prime mover to supply regeneration air to a regeneration zone which comprises recovering flue gases containing carbon monoxide and finely divided solid material from said regeneration zone, partially cooling said flue gases by generating steam in an indirect heat exchange zone, treating the partially cooled flue gases to remove finely divided solid material to a sufficiently low level such that the flue gases may be utilized and expanded in a turbine zone to generate power, heating said flue gas after removal of solid material therefrom by burning in a carbon monoxide combustion zone the carbon monoxide contained therein to an elevated temperature and above the temperature of the flue gas recovered from said regeneration zone, partially cooling the thus heated flue gases to a suitable temperature for introducing the flue gases to a turbine zone of said prime mover for passing the flue gases in indirect heat exchange with compressed air recovered from the compressor of said prime mover, expanding said compressed air at an elevated temperature in a turbine directly connected to the compressor of said prime mover, passing expanded compressed air at a reduced temperature to a second compression zone driven by the turbine to which the flue gases are passed, passing compressed air from said second compression zone to said regeneration zone and maintaining an open unrestricted by-pass for gaseous material between the air discharge from the turbine and the flue gas introduced to the turbine.

6. In a process for supplying regeneration gas to a fluid bed of finely divided catalytic material and regenerating said catalytic material the improved combination of steps for supplying large volumes of regeneration gas to a regeneration zone which comprises compressing air in a first compression zone, expanding compressed air obtained from said first compression zone at an elevated temperature in a first turbine zone, passing expanded air from said first turbine zone at a reduced temperature and pressure to a second compression zone, in said second compression zone compressing said expanded air to a sufficiently elevated pressure for passage of a major portion thereof to said regeneration zone, heating compresesd air in said regeneration zone by burning a combustible material therein to produce a flue gas stream containing carbon monoxide and entrained finely divided catalytic material at an elevated temperature and pressure, recovering a portion of the heat content of said flue gas stream in a steam generating zone thereby cooling said flue gas stream to a temperature not below the ignition temperature of carbon monoxide in a carbon monoxide catalytic combustion zone, treating said partially cooled flue gas stream to remove entrained fines to at least about .02 grain per cubic foot, passing flue gas of reduced fines content with a portion of the compressed air from said second compression zone to a carbon monoxide combustion zone for burning entrained carbon monoxide thereby reheating said flue gases to an elevated temperature, passing flue gases at an elevated temperature from said carbon monoxide combustion zone in indirect heat exchange with compressed air passed to said first turbine zone, passing partially cooled flue gases obtained from said indirect heat exchange zone at a desired elevated temperature and a pressure substantially equal to the pressure of the compressed air discharged from said first turbine zone to a second turbine zone wherein the flue gases are employed to develop power to drive the second compression zone, decovering flue gases from said second turbine zone at an elevated temperature and thereafter employing the recovered flue gases to generate steam in an indirect heat exchange zone.

7. An improved method for supplying regeneration gaseous material in a relatively low pressure regeneration process which comprises compressing atmospheric air in a first compression zone to an elevated pressure, heating said compressed air from said first compression zone by passing in indirect heat exchange with hot flue gases and thereafter further heating said compressed air by burning a suitable fuel therewith in a combustion zone to elevate the temperature of said compressed air to a temperature above about 1000° F., expanding said compressed air at an elevated temperature in a first turbine zone under conditions to develop suffcient power to drive said first compression zone, recovering compressed air from said first turbine zone at a reduced temperature and pressure, cooling a major portion of the recovered compressed air from said first turbine zone in at least one indirect heat exchange zone to a sufficiently low temperature such that the compressed air may be passed to a second compression zone, passing the thus cooled compressed air to said second compression zone wherein the air is compressed to a sufficient pressure for use in the regeneration process, passing the compressed air from said second compression zone to the regeneration step of the process wherein the compressed air is converted to a flue gas at an elevated temperature above about 1000° F., recovering flue gas from said regeneration zone at an elevated temperature and pressure, cooling the recovered flue gas, removing entrained finely divided particle material from the cooled flue gas, removing by combustion carbon monoxide entrained in the flue gas, passing flue gases after the removal of carbon monoxide and finely divided particle material therefrom at an elevated temperature above about 1000° F. to said first indirect heat exchange step wherein the flue gases are cooled to a temperature suitable for passage at the pressure of the flue gases to a second turbine zone, expanding the flue gases passed to the second turbine zone under conditions to develop sufficient power to drive said second compression zone and providing an unrestricted open by-pass for gaseous material between the discharge of said first turbine zone and the inlet of said second turbine zone.

8. A method for supplying regeneration air to a regeneration zone which comprises maintaining a two-shaft gas turbine compressor prime mover so that a first turbine of said prime mover drives the compressor of said prime mover and the second turbine of said prime mover drives a booster compressor, indirectly heating compressed air removed from said prime mover compressor with regeneration flue gases and expanding said indirectly heated compressed air in said first turbine, recovering expanded air from said first turbine, cooling, and passing the expanded air after cooling to said booster compressor wherein the air is compressed to an elevated pressure suitable for passage to said regeneration zone, passing a major portion of said compressed air from said booster compressor to said regeneration zone, heating said compressed air in said regeneration zone by burning a combustible material therein to produce a flue gas of elevated temperature containing carbon monoxide, recovering flue gas from said regeneration zone, burning carbon monoxide in said flue gas in a combustion zone with a portion of the compressed air from said booster compressor, passing flue gas at an elevated temperature from said combustion zone to said indirect heating step, passing a portion of the flue gas from said indirect heating step to said second turbine at substantially the same pressure as the expanded air from said first turbine zone, recovering flue gas at a reduced temperature and pressure from said second turbine, combining said flue gas with the remaining portion of the flue gas from said indirect heating step and passing the combined flue gas stream to a steam generating zone.

References Cited in the file of this patent

UNITED STATES PATENTS

| | | |
|---|---|---|
| 2,167,655 | Houdry et al. | Aug. 1, 1939 |
| 2,167,698 | Vose | Aug. 1, 1939 |
| 2,307,672 | Dunham | Jan. 5, 1943 |
| 2,339,846 | Eastman et al. | Jan. 25, 1944 |
| 2,357,365 | Van Horn et al. | Sept. 5, 1944 |
| 2,758,979 | Guthrie | Aug. 14, 1956 |